(12) United States Patent
Lee

(10) Patent No.: US 6,267,675 B1
(45) Date of Patent: Jul. 31, 2001

(54) ADVERTISING GAME

(75) Inventor: Han Seok Lee, Seoul (KR)

(73) Assignee: Icorea Co. Ltd., Seoul (KR)

( * ) Notice: Subject to any disclaimer, the term of this patent is extended or adjusted under 35 U.S.C. 154(b) by 0 days.

(21) Appl. No.: 09/421,609

(22) Filed: Oct. 20, 1999

(30) Foreign Application Priority Data

Sep. 28, 1999 (KR) .................................................. 99-41607

(51) Int. Cl.[7] .................................................. A63F 13/12
(52) U.S. Cl. .................................. 463/40; 463/42; 463/1; 463/30; 705/14
(58) Field of Search .................................. 463/42, 41, 40, 463/1, 9, 30, 16, 7; 273/430, 459, 460, 461, 236, 237; 705/14, 26, 27; 902/1, 2

(56) References Cited

U.S. PATENT DOCUMENTS

| | | | |
|---|---|---|---|
| 5,643,088 | * 7/1997 | Vaughn et al. ......................... | 463/40 |
| 5,823,879 | 10/1998 | Goldberg et al. . | |
| 5,890,963 | * 4/1999 | Yen ........................................ | 463/42 |
| 5,964,660 | * 10/1999 | James et al. ............................. | 463/1 |
| 6,036,601 | * 3/2000 | Hedsil .................................... | 463/42 |
| 6,102,406 | * 8/2000 | Miles et al. .......................... | 273/430 |

FOREIGN PATENT DOCUMENTS 09010440    1/1997   (JP) .

* cited by examiner

Primary Examiner—Michael O'Neill
(74) Attorney, Agent, or Firm—Milbank, Tweed, Hadley & McCloy LLP

(57) ABSTRACT

The present invention relates to an advertising game where netizens are continuously exposed to advertisers' products in a very natural way. In this advertising game, the game screen is composed of advertisement frames and the advertiser=s product is displayed in these frames. Therefore, the main contents are advertisements and by removing all the unnecessary elements to the advertisements, the disclosed invented advertising game is capable of maximizing the enhancement of the advertisement effect for netizens on the internet.

44 Claims, 14 Drawing Sheets

ADVERTISING GAME

BACKGROUND OF THE INVENTION

1. Field of the Invention

The present invention relates to an advertising game, and in particular to an advertising game which is implemented on an on-line network environment as in the internet and PC communication.

2. Description of the Prior Art

As the number of internet users increase significantly, the utilization of internet advertising medium will accordingly increase. The utilization of internet advertising medium is increasing more widely than other advertising mediums in view of its growth potential, growth rate, and effectiveness.

An important feature of the internet advertising is that a potential customer is able to access the advertising medium on the internet. In the conventional internet advertising method, various methods are utilized to enhance the advertising effect by providing various beneficial information and data, or cash rewards based on the needs of the customer.

Among the above-described methods, the method of providing a small amount of cash to advertisement viewers is the recent trend. This method is used increasingly and is recognized as the most effective advertising method on the internet.

However, in the above-described cash rewarding internet advertising methods, the tendency is to limit the frequency of exposures from 1 to 3 times per visit or day due to the advertiser's payment limit, and favored only by a small number of guaranteed seeking netizens.

SUMMARY OF THE INVENTION

Accordingly, the objective of the present invention is to provide an advertising game which overcomes the problems encountered in a conventional advertising game by naturally and continuously exposing advertisements yet requiring high level of interest.

Another objective of the present invention is to provide an advertising game which makes it possible to satisfy the needs of advertisers and netizens (internet users).

To achieve the above objectives, there is an advertising game provided, which includes a step for sequentially displaying an initial screen and a main screen as a netizen (internet user) accesses a certain site, a step for displaying a game screen with respect to a certain game type as a game type is selected by a member on a main screen wherein said main screen includes a display button for displaying a final total required time required for one game, an advertising display button composed of a plurality of frames, a display button for displaying points obtained when the advertisements on the frames are aligned in a column, row and diagonal direction, a display button for displaying the total points, a game start bar for starting the game, a display button for rotating the frames, an OK display button for obtaining points displayed on the point display button, and a display button for finishing a triple chance game button and game which are used for obtaining additional points except for the points displayed on the points display unit, a step for rotating the frames when a game start instruction is inputted on the game screen, a step for adding a certain points to the total points in accordance with an aligned state of the advertisements displayed on the frames when the rotation of the frames is stopped, a step for providing a hint to the gamer with respect to the obtained points of the day when the current game is being performed, and a step for displaying a winner of the day based on the points of the day when the game is finished.

Additional advantages, objectives and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

The embodiments of the present invention will be explained with reference to the accompanying drawings.

Figure 1:
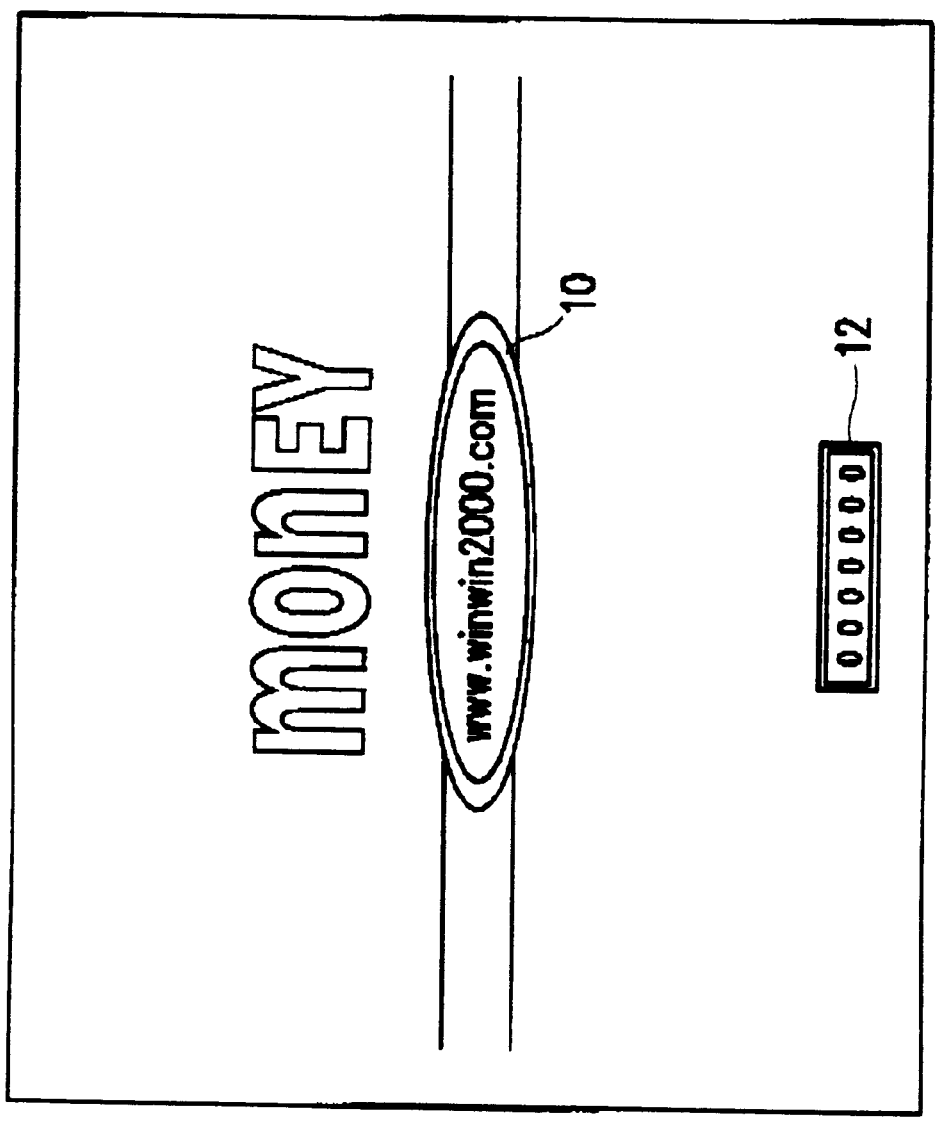
FIG. 1 is a view illustrating the initial screen according to the present invention.

FIG. 1 illustrates an initial screen(page) according to the present invention. The initial screen will appear on a monitor when an internet user(hereinafter called as a netizen) accesses a web site(for example, the homepage address http://www.winwin2000.com, hereinafter called as winwin2000 site) containing the advertising game.

The initial screen includes a screen link region 10 for moving to the main screen(page), and a total hit number display region 12 for displaying the total number of netizens who visited the winwin2000 site.

When the netizen clicks the screen link region 10 of the initial screen using a mouse, the main screen is displayed. It will also appear after a certain time is elapsed. In the screen link region 10, various characters are sequentially displayed such as "www.winwin2000.com→1,000,000won in 5 minutes→www.winwin2000.com→Click! click! Bingo game".

Figure 2A:
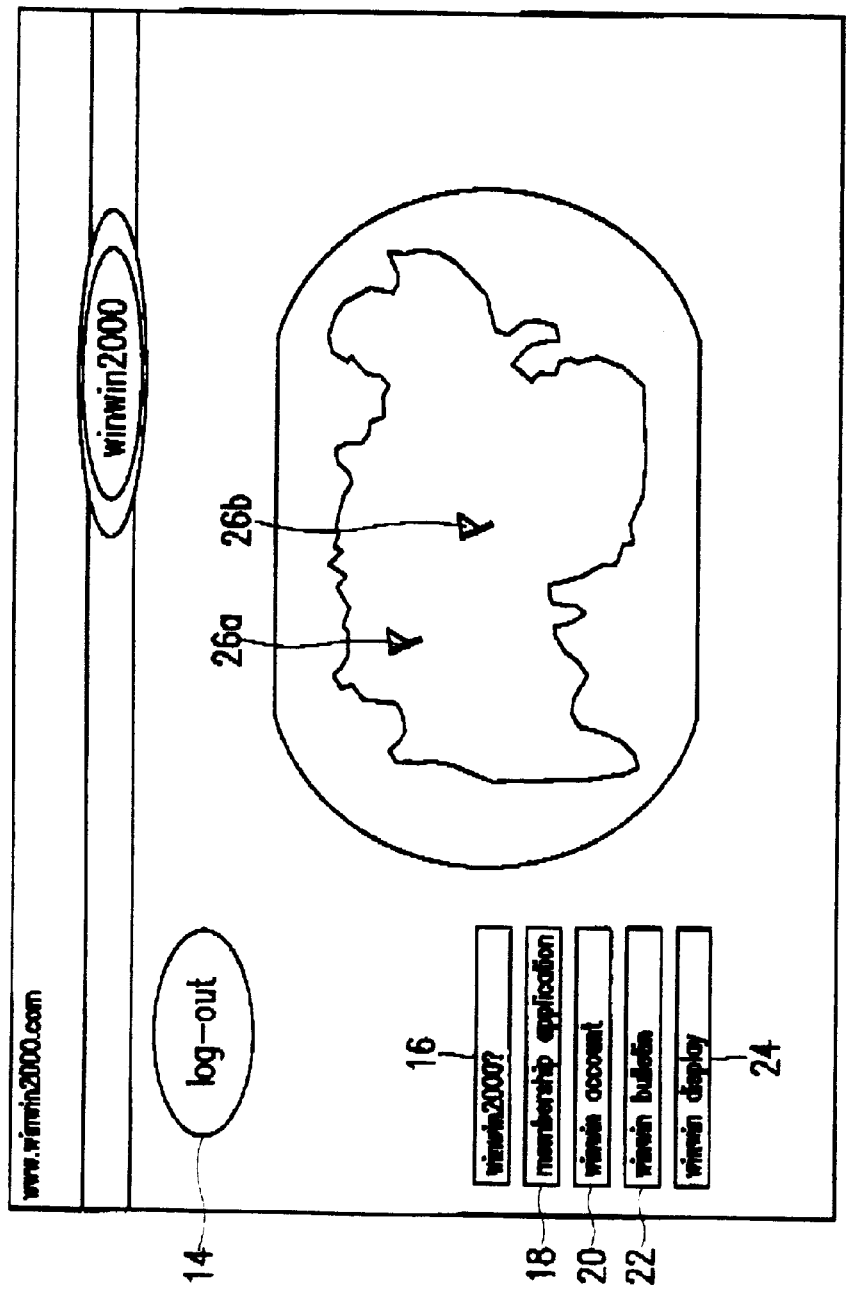
FIGS. 2A and 2B are views illustrating the main screen according to the present invention.
Figure 2B:
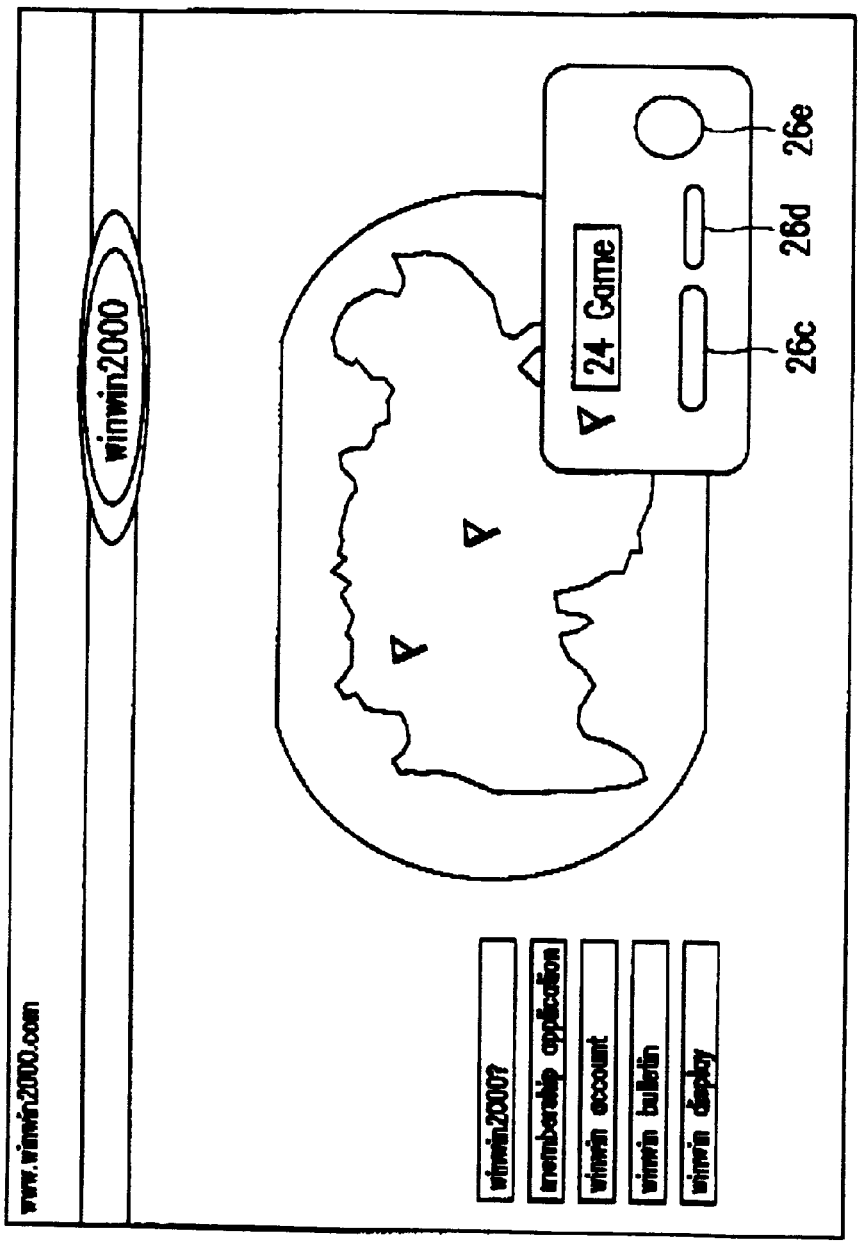

FIGS. 2A and 2B are views illustrating the main screen according to the present invention. The main screen includes a log-out menu 14 for exiting from the winwin2000 site, a winwin2000 menu 16 containing overall descriptions of the winwin2000 site, a membership application menu 18 for a membership application, a winwin account menu 20 for checking the balances of the winwin account for the members, a winwin bulletin menu 22 used for posting messages on the bulletin board, a winner display menu 24 used for checking the winner list and game entrance menu 26a and 26b used for selecting the game type 04 game or 24 game provided in the present invention.

As shown in FIG. 2A, when clicking between the flag-shaped game entrance menu 26a and 26b, as shown in FIG. 2B, the screen composed of a game result button 26c, a demo game button 26d, and a start button 26e are displayed.

Figure 3:
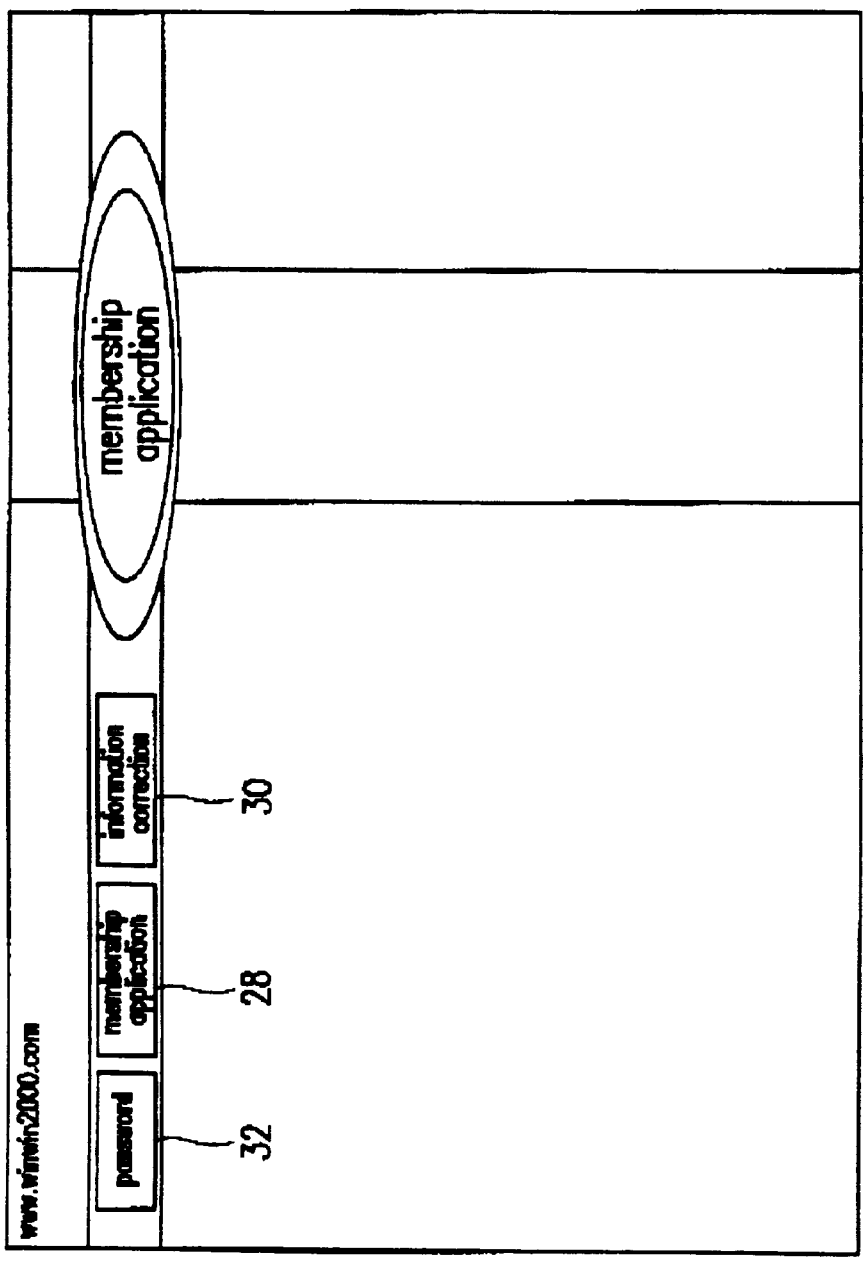
FIG. 3 is a view illustrating an example of a membership application screen.

FIG. 3 is a view illustrating a membership application screen according to the present invention. When clicking the membership application menu 18(FIG. 2A), the membership application screen is displayed.

The membership application screen includes a membership application link region 28, an information correction link region 30 for correcting the contents in the submitted member information, and a password link region 32 for obtaining the information on password for members who cannot remember their passwords.

Figure 4:
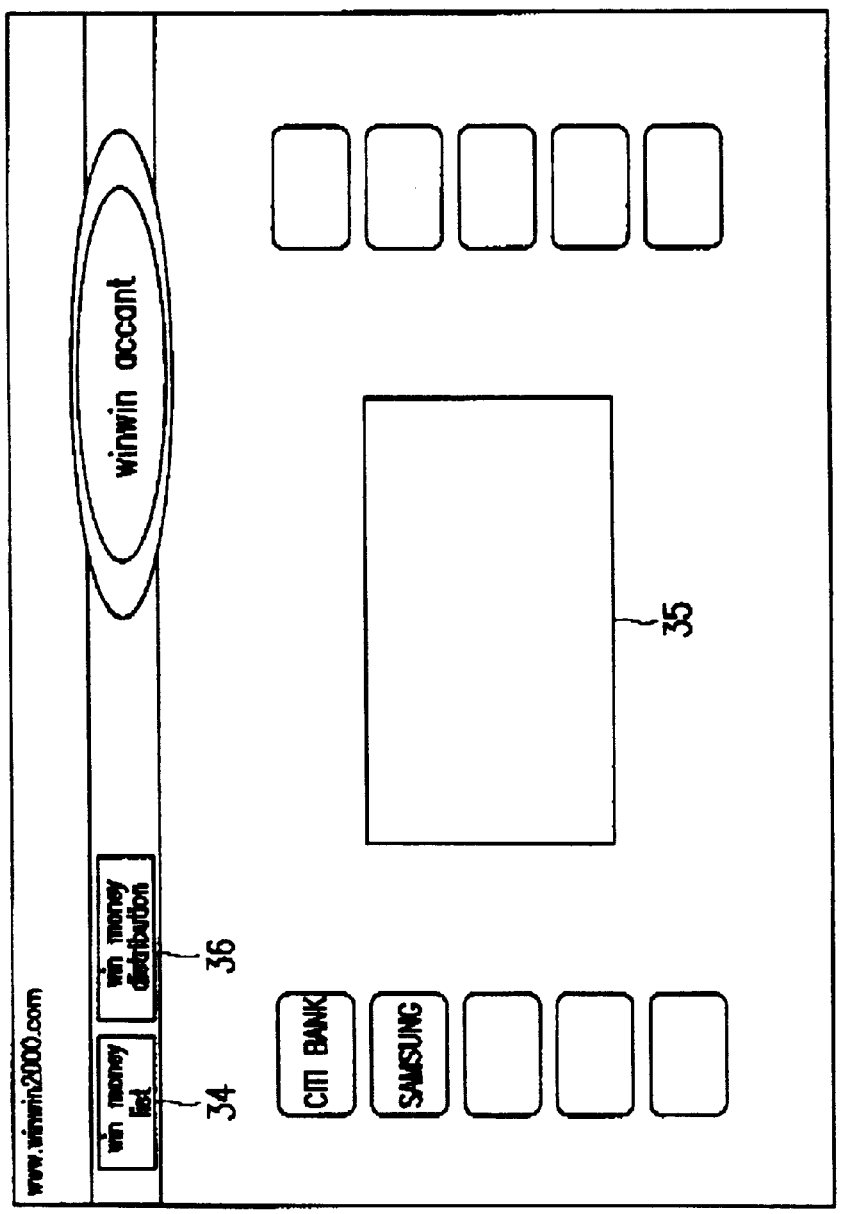
FIG. 4 is a view illustrating a winwin account screen according to the present invention.

FIG. 4 is a view illustrating a winwin account screen according to the present invention. The winwin account screen is displayed when the winwin account menu 20 is clicked.

The winwin account screen includes a win money list link region 34 and a win money distribution link region 36 which are accessed only by members. The members(for example, top 100 member) possessing biggest balances of win money in winwin accounts(win money provided by an information service provider), total win money amount, utilized win money amount, credit and debit entries of the win money, and a win money balance is listed on the winwin account screen in accordance with the click selected menu of corresponding region. The advertising banners of the sponsors are positioned on both left and right sides of the screen.

A certain size advertising region 35 is located at the center portion of the winwin account screen. The advertising banners of the sponsors at the left side of the winwin account screen are sequentially displayed in the advertising region 35. In the present invention, the banner slides are displayed in the advertising region. In addition, the advertising region 35 can sequentially display motion picture frames of advertising sponsors positioned at the left and right side of the winwin account screen.

Figure 5:
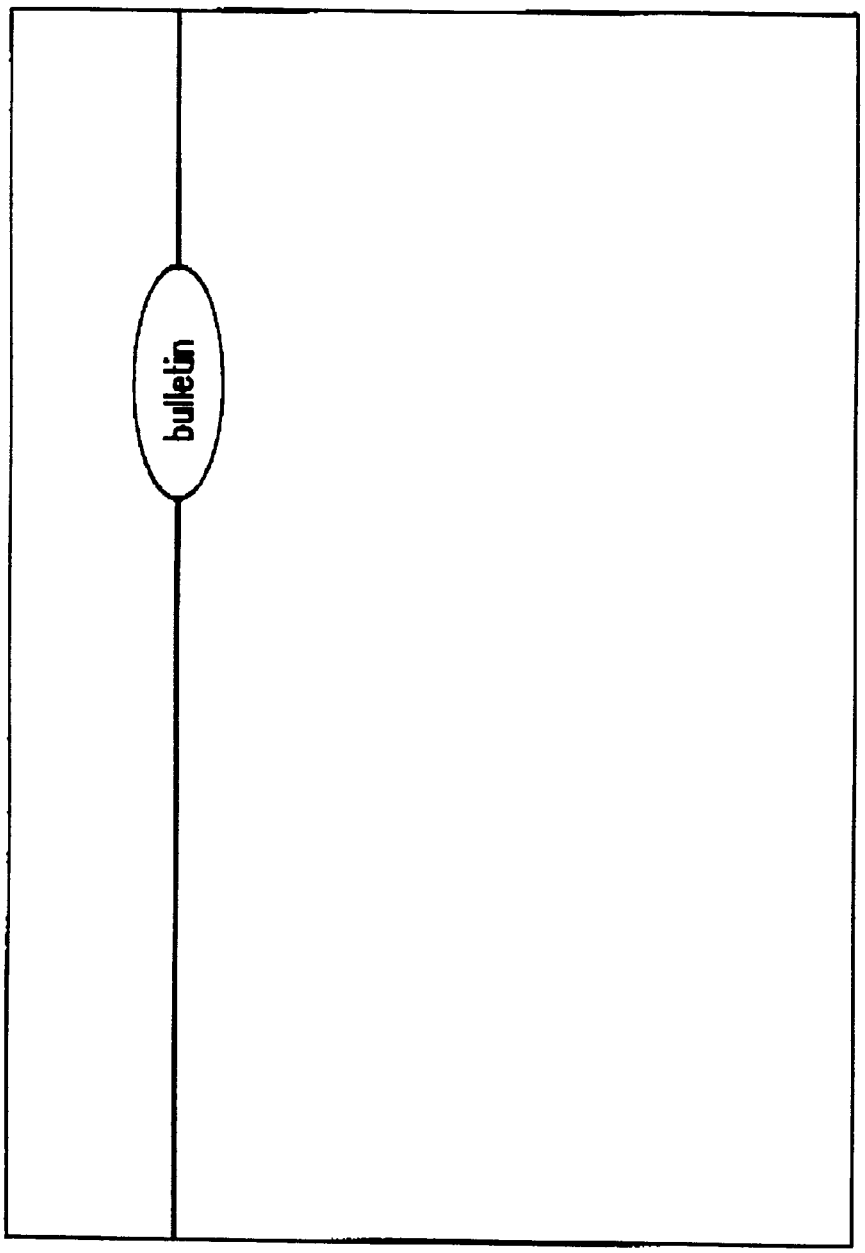
FIG. 5 is a view illustrating a bulletin board according to the present invention.

FIG. 5 is a view illustrating a winwin bulletin screen according to the present invention. As shown therein, when the winwin bulletin menu 22(FIG. 2A) is clicked, the winwin bulletin screen is displayed.

The winwin bulletin screen is accessible by only the members and includes a bulletin region for listing free writings, a bulletin board region for displaying users' personal information or home page information, and a form mail type bulletin region for sending any comments and suggestions by the users.

Figure 6:
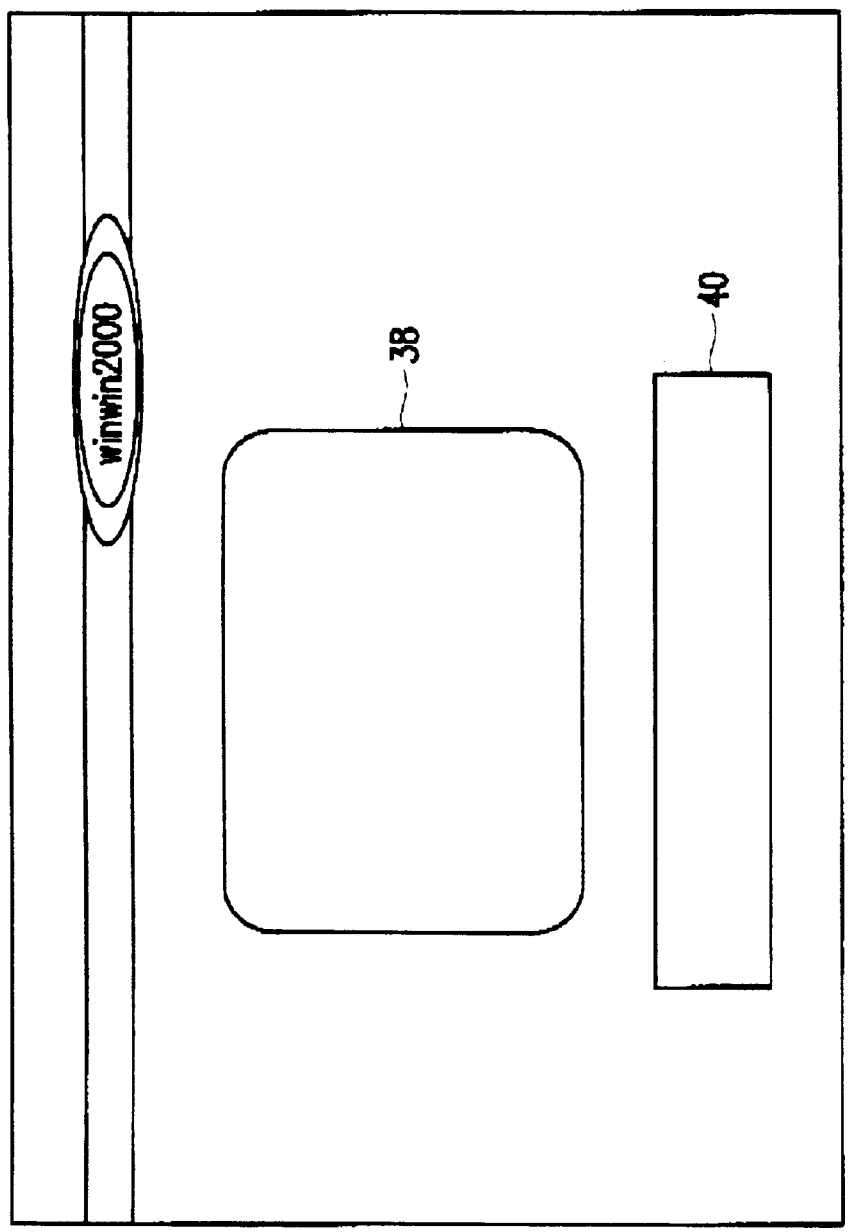
FIG. 6 is a view illustrating a winner display screen according to the present invention.

FIG. 6 is a view illustrating the winner display screen according to the present invention. As shown therein, the winner display screen is displayed when the winner display menu 24(FIG. 2A) is displayed.

The winner display screen includes an advertising screen 38 and a display button region 40 clicked for viewing the game winners. At the initial stage, the advertising screen 38 is displayed for about 5 seconds, and then the button region 40 is displayed at the lower portion of the advertising screen 38 for displaying the list of the game winners. On the advertising screen 38, the advertising contents disappear after about 15 seconds, and then the list of the cash award receiving game winners for the day or the past days appear.

On the winner display screen, it is possible to search an user's game result. For example, when the button region 40 is clicked, and the user's ID is inputted, it is possible to check the user's performance for one week, and a form mail page is located so that the cash award receiving members can correspond.

Figure 7:
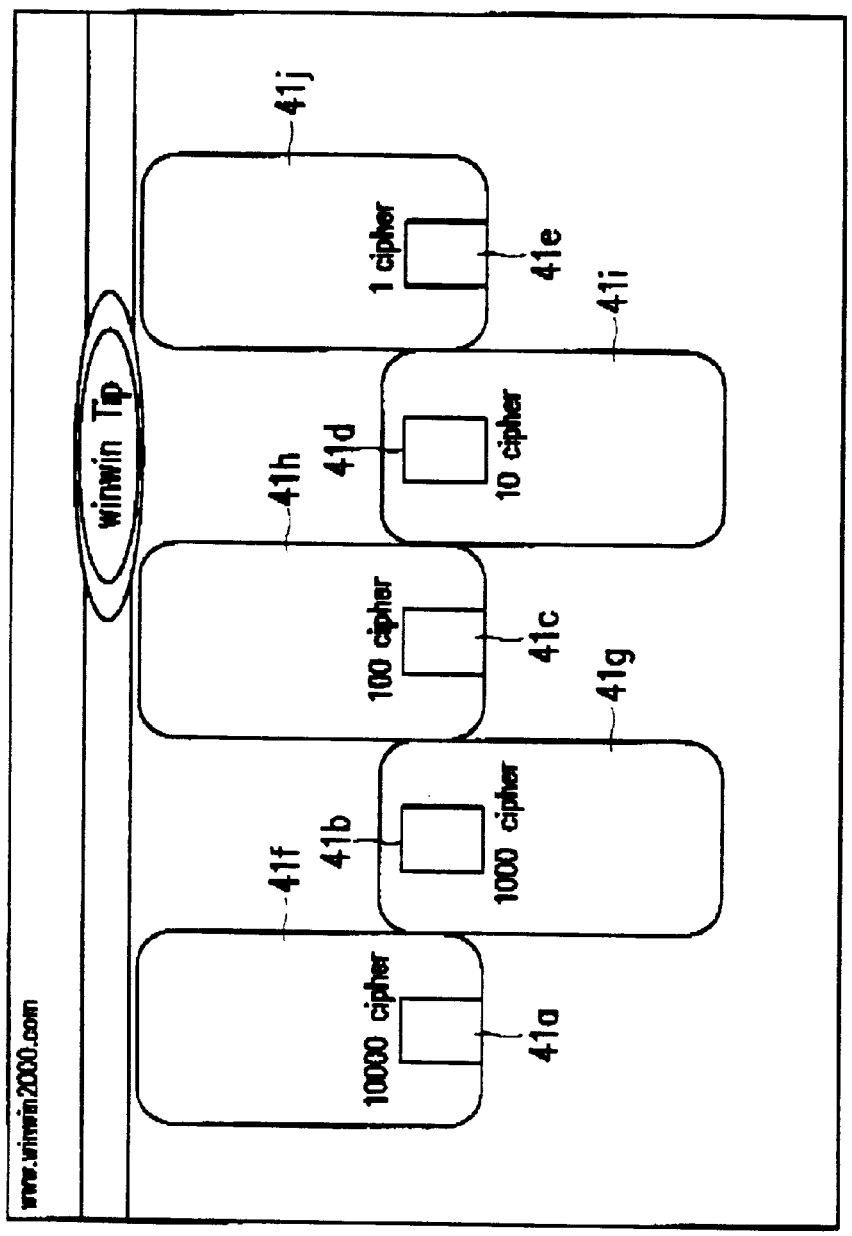
FIG. 7 is a view illustrating a winwin tip screen according to the present invention.

FIG. 7 is a view illustrating a winwin tip screen according to the present invention. As shown therein, winning number display regions 41a through 41e composed of 5 digits are displayed on the winwin tip screen. The number for a certain region is determined by the ISP(Information Service Provider).

5 digits are expressed in a text form, and the display regions 41f through 41j are provided at the lower portion of each digit for displaying the advertising banners. The numeral of each digit can be checked by linking to the sites which provide the information with respect to the numeral of a corresponding digit by clicking a corresponding advertising banner. Namely, a member can become a winner of the game by correctly matching total points with the numbers shown in these fields. For example, the first digit of the five digit number can be checked at the site which provides foreign exchange rate information. The second digit is directed to a site which provides an entertainment information, and the third digit is directed to a site which provides sports information, and the fourth and fifth digits are directed to a site which provides local stock exchange information.

Figure 8:
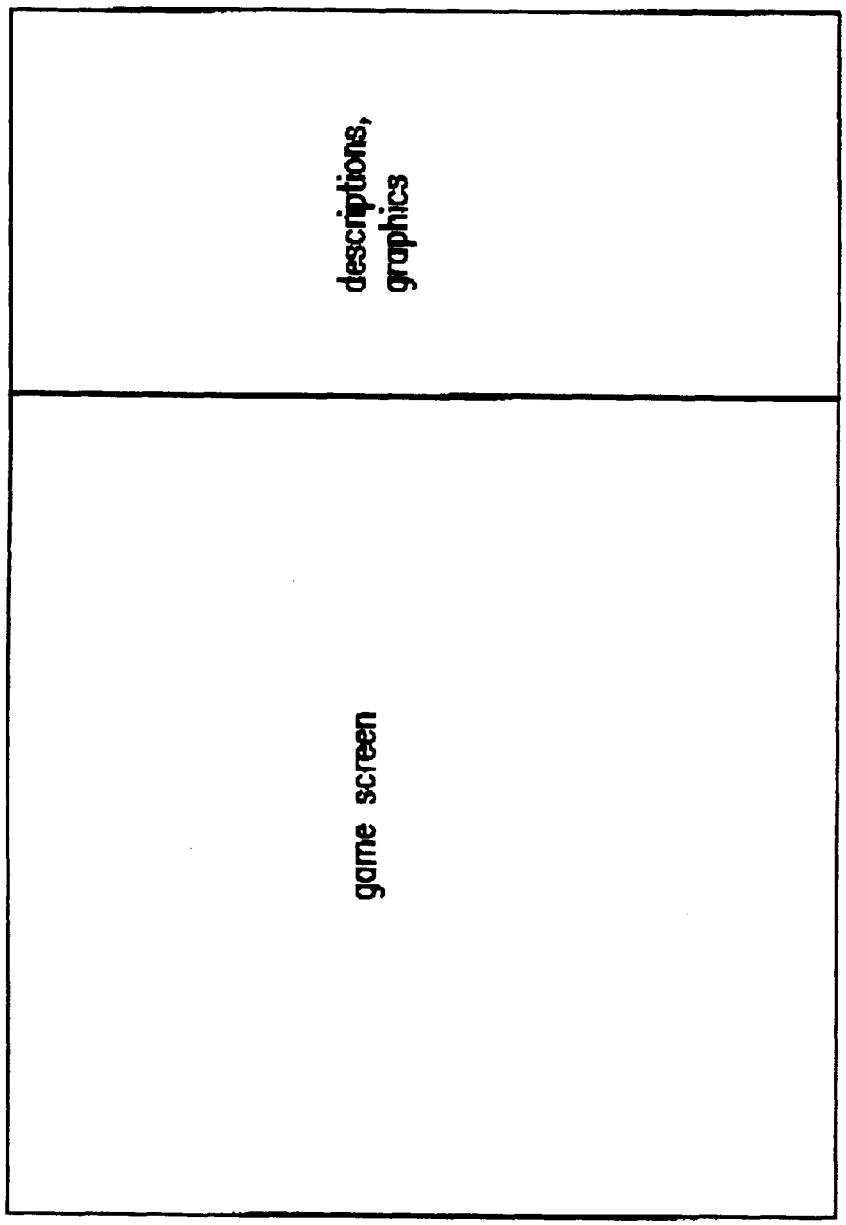
FIG. 8 is a view illustrating an example of a demonstration game screen according to the present invention.

FIG. 8 is a view illustrating a demo game screen according to the present invention and is displayed when the demo game button 26d(FIG. 2B) is clicked. The demo game screen includes a game screen and a region for displaying various descriptions and buttons which are used for playing the game.

Figure 9:
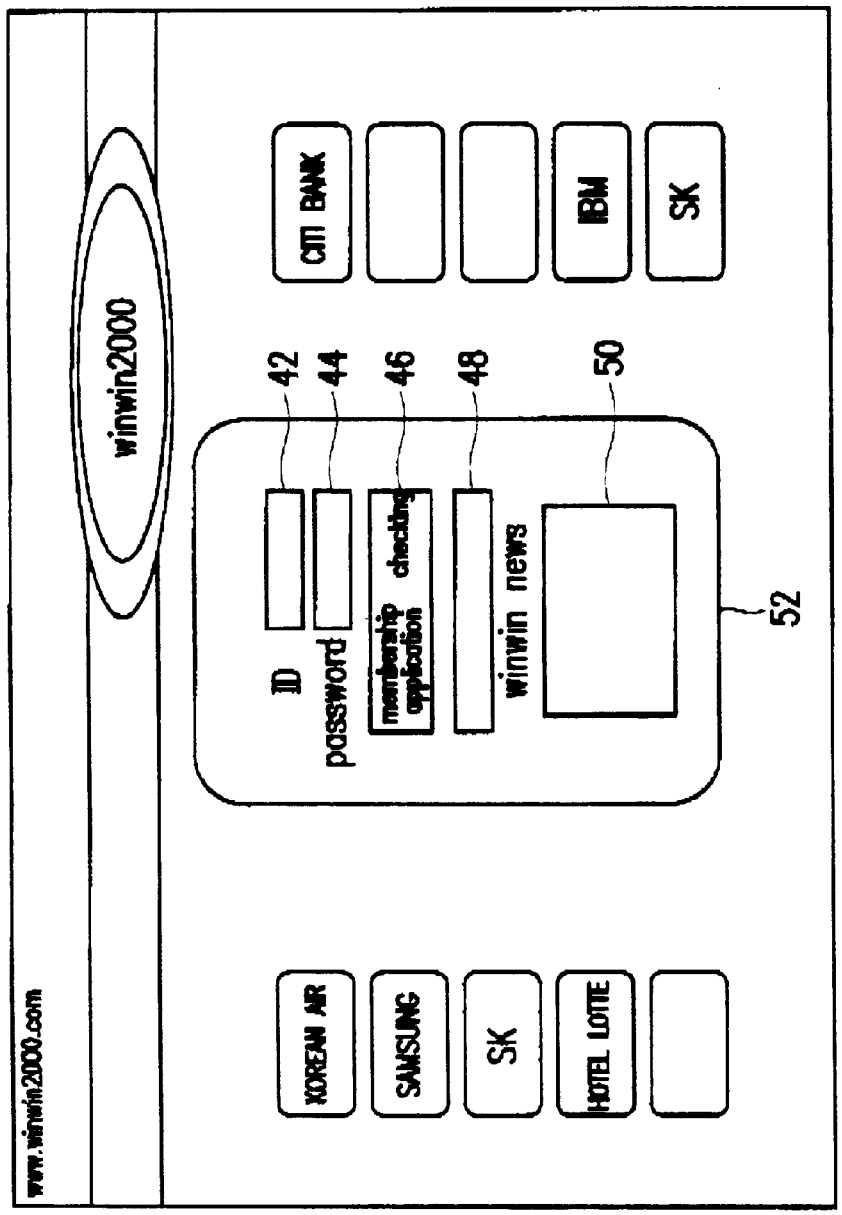
FIG. 9 is a view illustrating an example of a log-in screen according to the present invention.

FIG. 9 is a view illustrating an example of a log-in screen according to the present invention and is displayed when the member only menus such as the start button 26e(FIG. 2B) is selected.

The display screen 52 of the log-in screen includes an ID input region 42, a password input region 44, a member verification region 46, a member application region 48, and Region 50 for users who forgot their passwords and important news notices for the users. The advertising banners of the sponsors are displayed on the left and right sides of the display screen 52.

When a corresponding advertising banner is clicked among a plurality of advertising banners, a corresponding home site of the advertiser is linked and displayed on an open Window.

Figure 10:
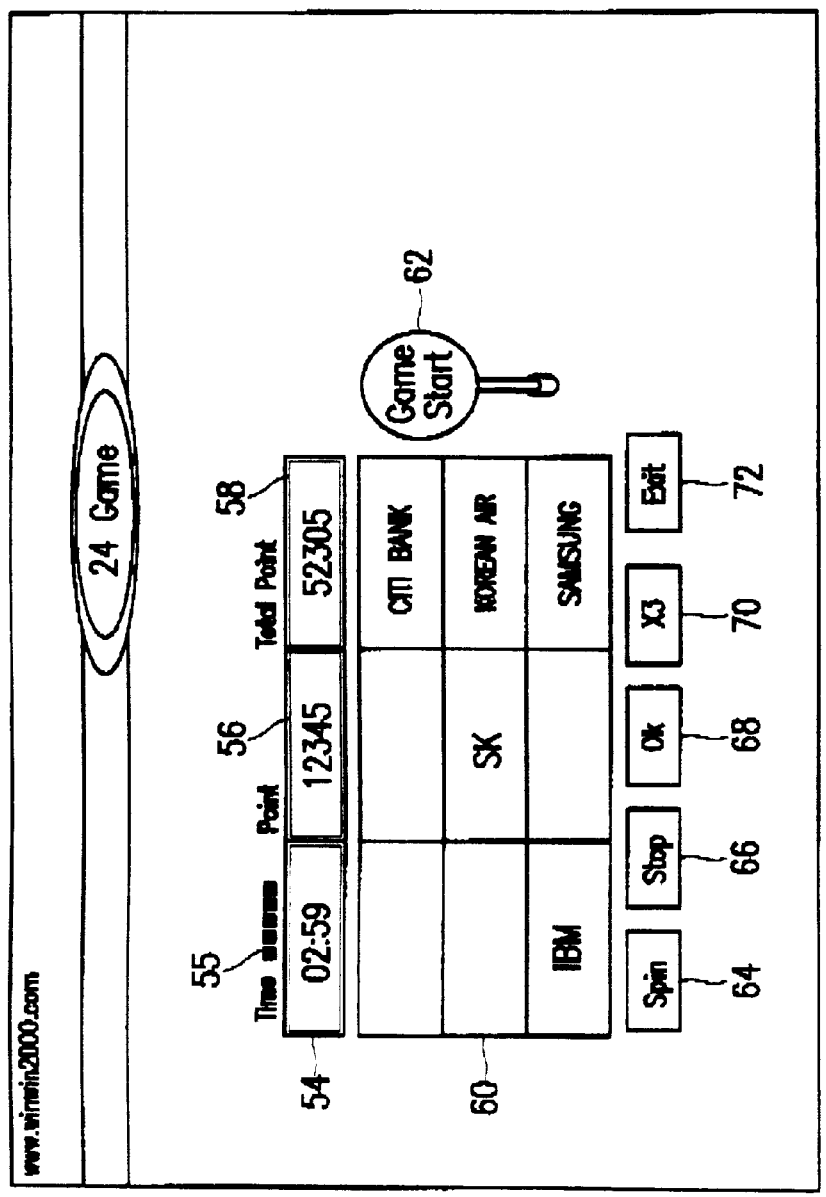
FIGS. 10 and 11 are views illustrating an example of a game screen utilized on a game type according to the present invention.
Figure 11:
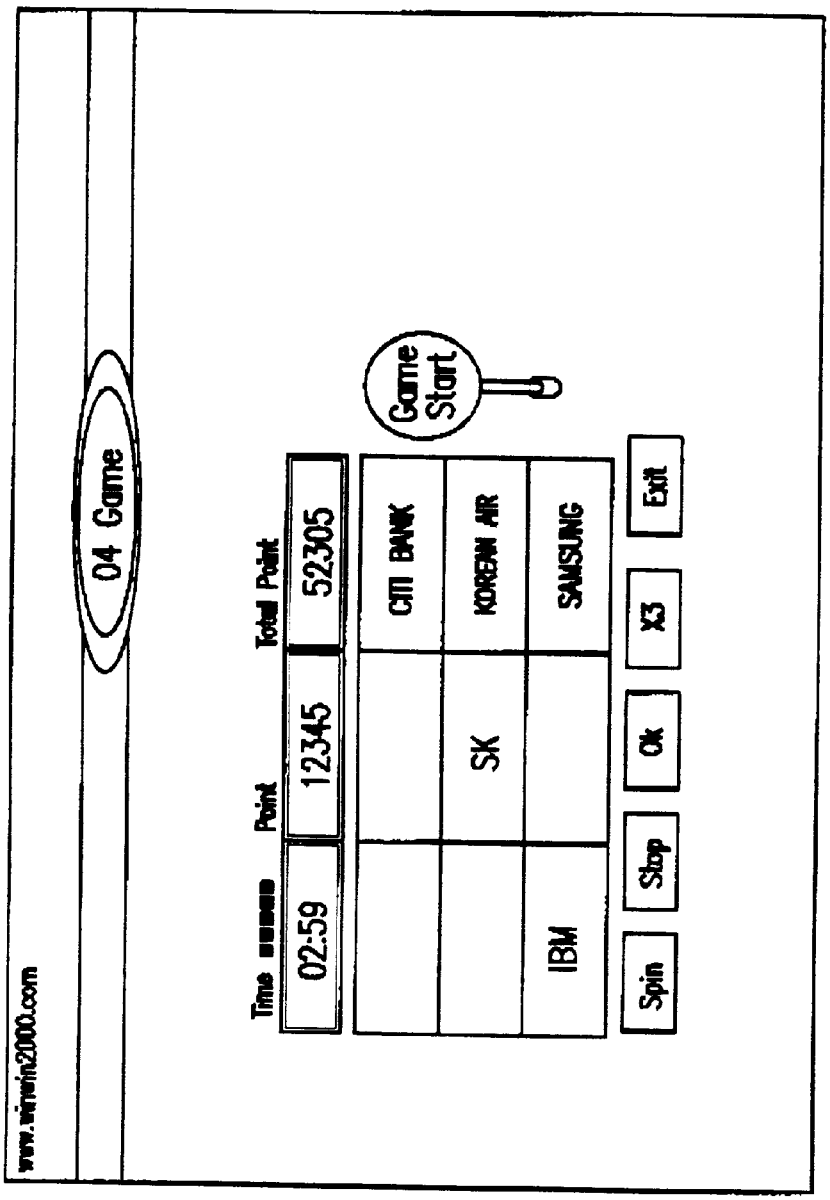

FIGS. 10 and 11 illustrate an example of a game screen based on a game type according to the present invention which is displayed when a member clicks the start button 26e(FIG. 2B).

The examples of FIGS. 10 and 11 are different only in the background and same in all other areas of the game. So, only the example of FIG. 10 will be explained.

On the game screen, there is a time display frame 54, points display frame 56, total points display frame 58, an advertising display frame composed of frames n×k (where n>2, k>2), a game start bar 62, a rotation play button 64, a stop button 66, an OK button 68, a triple chance game button 70, and a game exit button 72.

On the time display frame 54, the maximum time required for the selected game type among a plurality of game types and time duration for continuously displaying the game screen of the selected game type are displayed. For example, assuming that the maximum time is 5 minutes, the game will start with a 5 minute count-down beginning with the click of the game start bar. When 5 minutes in play time is elapsed, the result of the game is automatically displayed. If a player wishes to exit the game, the player can easily exit from the current game by clicking the exit button.

Namely, as the game starts, the time display frame 54 displays 5 minutes, and the time is counted down by 1 second.

In addition, the time display frame 54 includes a minute unit display frame 55 with a certain number of display devices(preferably, 5 devices in the present invention) at the upper portion of the time display frame 54. When the time display frame 54 displays time by counting in seconds for 5 minutes, the minute unit display frame 55 will turn off after elapse of every minute to display the remaining number of minutes. The minute unit display frame 55 may be turned on as game play time exceed every minute to display the number of elapsed minutes.

The point display frame 56 displays the points obtained from the most recent game spin within the maximum time limit displayed on the time display frame 54, and the total points display frame 58 displays the total accumulated points.

The company name, logo, product name, slogan, etc. of an advertisement sponsor are displayed on each frame of the advertisement display slot 60 to represent the most effective advertising message desired by the sponsor company. The advertisement display slot 60 is composed of 9 frames. The number of the frames may change to meet the requirements of the game advertisers.

The game start bar 62 is used to start the game, and the spin button 64 is used to rotate the frames of the advertisement display frames 60 by column from the upper side to the lower side. When the frame of the advertisement display frames 60 is rotated by the column unit from the upper side to the lower side, an advertisement displayed on the frame is continuously moved from the upper side to the lower side.

In the embodiment of the present invention, the rotation of the frame of the advertisement display frame 60 is described from the upper side to the lower side. However, in another embodiment of the present invention, the rotation may be implemented from the lower side to the upper side by the column unit. In addition, the rotation may be implemented from the left side to the right side or from the right side to the left side by the row unit. Each frame may be independently converted for thereby rotating each frame upwardly and downwardly or rightwardly and leftwardly, so that the advertisements of the sponsors are changed on each frame. In addition to the above-described rotation method, the rotation sequence of each frame may be randomly determined for thereby rotating the same, so that it is possible to enhance a gamer's concentration on the advertisements.

The stop display button 66 is used for stopping the frame rotation of the advertisement display frame 60.

The OK display button 68 is used for obtaining the points displayed on the point display frame 56 when the rotation of the frame stops, and the advertisements of the same sponsors are aligned in a certain row, column, or diagonal direction.

The triple chance game button 70 is used to play a bonus game to triple the points displayed on the point display frame 56. The game stop display button 72 is used for finishing the current game.

The operation of the advertising game according to the present invention will be explained.

When a netizen accesses the winwin2000 site on the internet, the initial screen is displayed on the monitor(not shown) of the netizen as shown in FIG. 1. On the initial screen, when the screen link region 10 is clicked, the current screen is changed to the main screen as shown in FIG. 2A. When a certain menu among the flag-shaped fame start menu 26*a* and 26*b* is selected on the main screen, a card shaped screen as shown in FIG. 2B is displayed.

As shown in FIG. 2B, when the start button 26*e* is clicked, as shown in FIG. 9, the log-in screen is displayed. When the verification button is clicked after the ID and password are inputted, a game screen(shown in FIG. 10 or 11) is displayed based on the selected game type. In the embodiment of the present invention, two game types are assumed. In the 24 game shown in FIG. 10, only one winner is awarded the stated amount of money, and in the 04 game shown in FIG. 11, the top 33 winners are equally awarded.

As shown in FIG. 10, when a gamer clicks the game start bar 62 on the game screen, the game start bar 62 is moved to the lower portion, and the time display frame 54 displays 5 minutes and counts down by 1 second, and the minute unit display frame 55 above the time display frame 54 displays the remaining time by a minute unit.

In addition, when the gamer clicks the rotation display button 64, the frame of the advertisement display frame 60 is rotated from the upper side to the lower side by the column unit, and the rotations of the frames of the first column(for example, left side column) automatically stop. Thereafter, when the gamer clicks the stop display button 66, the rotations of the frames(for example, the frames of the center column) of one column between the frames of the remaining two columns stop. In addition, the rotations of the frames of the remaining one column(frames of the right side column) automatically stop after a certain time. The product name, product image, company logo, slogan, etc. of the sponsor are displayed on each frame of the advertisement display frames 60. Therefore, when the rotations of all frames stop, the product name, product image, company logo, slogan and etc. of the sponsor are highly recognized by the gamer.

In other words, in the present invention, it is possible to directly control the rotations of the frames of the center column by the gamer. Therefore, when the rotations of the frames of the left side column automatically stop, the gamer checks the advertisement arrangement on the frame of the left side column and determines an advertisement arrangement of the frame of the center column for thereby stopping the rotation of the frame of the center column. In the case that the advertisement arrangement of the frame of the center column is determined, since the gamer checks the advertisement arrangements, the gamer is automatically guided to see the advertisements of the sponsors.

When the rotations of the frames of the advertisement frame 60 stop, and the advertisements of each frame aligned on the advertisement display frame 60 are aligned with the advertisements of the same sponsors in a certain row, column, or diagonal direction, the advertisements of a corresponding alignment are blinked or featured by a certain method. For example, in the case that the advertisements of two frames aligned in a certain row, column, or diagonal direction are provided by the same sponsor, two frames may be blinked, or a certain color indication line may be given, so that the gamer can easily recognize the advertisements. In addition, in the case that the advertisements of each frame aligned on the advertisement display frame 60 are aligned with the advertisements of three same sponsors, a pop-up method may be used, so that the gamer can easily recognize the advertisements. In this case, a certain sound such as "Bingo!" may be produced.

The points are displayed based on the alignment on the points display frame 56. In this case, only the OK display button 68 may be blinked, or the OK display button 68 and the triple chance game button 70 may be concurrently blinked. In the case that only the OK display button 68 is blinked, the current points displayed on the point display frame 56 may be added to the total points. The OK display button 68 is clicked, and then the rotation display button 64 can be clicked, and when it is clicked the frames of the advertisement display frame 60 is rotated.

Figure 12:
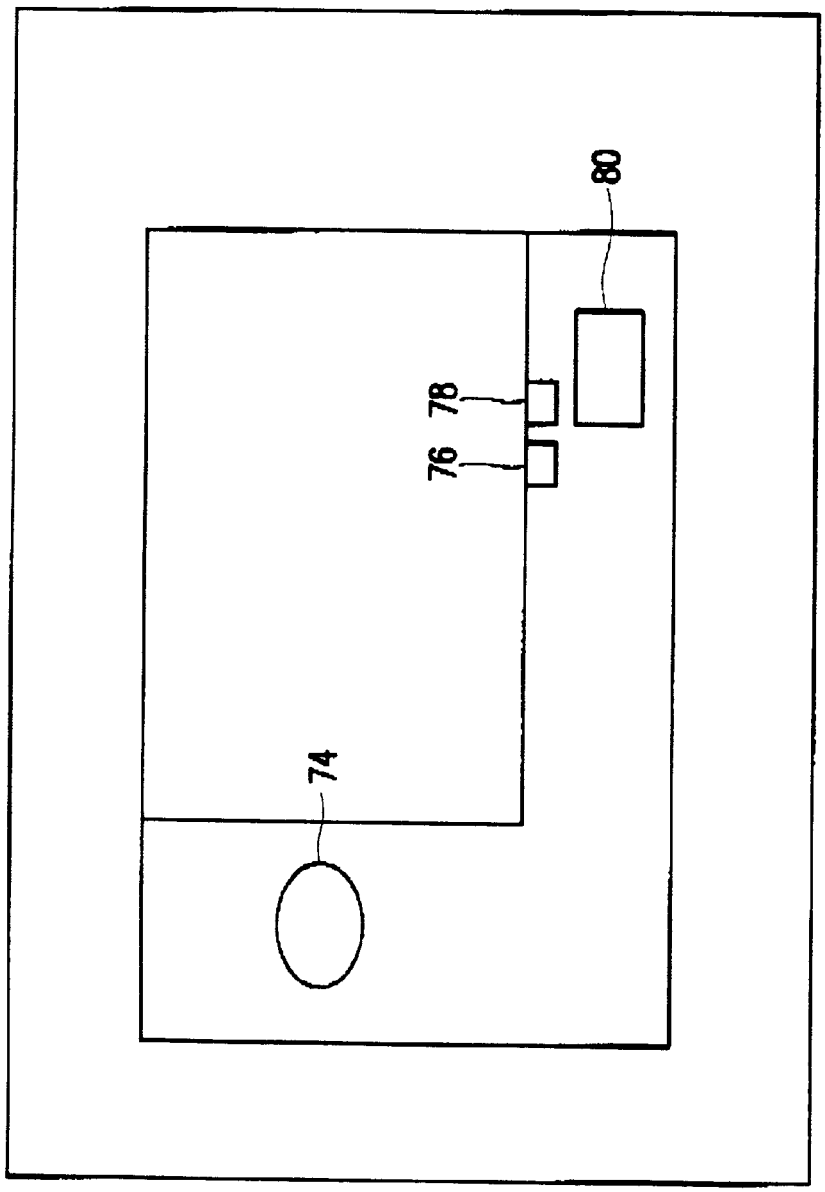
FIG. 12 is a view illustrating a triple chance game screen according to the present invention.

In the case that the OK display button 68 and the triple chance game button 70 are concurrently blinked, when the gamer clicks the OK display button 68, only the points displayed on the points display frame 56 are added to the points of the total points display frame 58. On the contrary, in the case that the OK display button 68 and the triple chance game button 70 are concurrently blinked, when the gamer clicks the triple chance game button 70, as shown in FIG. 12, the triple chance game screen is displayed. In the embodiment of the present invention, the triple chance game is set so that the points can be tripled consecutively for the maximum of three times in the triple chance game mode with 3 triple chance game opportunities in 5 minutes.

The triple chance game screen includes a selection button 74 used for selecting one from various selection options displayed on the screen, a restart button 78, and an exit button 80 used for stopping the triple chance game and returning to the main game as shown in FIG. 10.

If the triple chance was successful, points will be tripled, and the start button 74 and the exit button 80 are alternately blinked. When the gamer clicks the start button 74, a chance to triple the points is available to the gamer. When clicking the exit button 80, the gamer exits from the triple chance game, and the current points are added to the total points.

Figure 13:
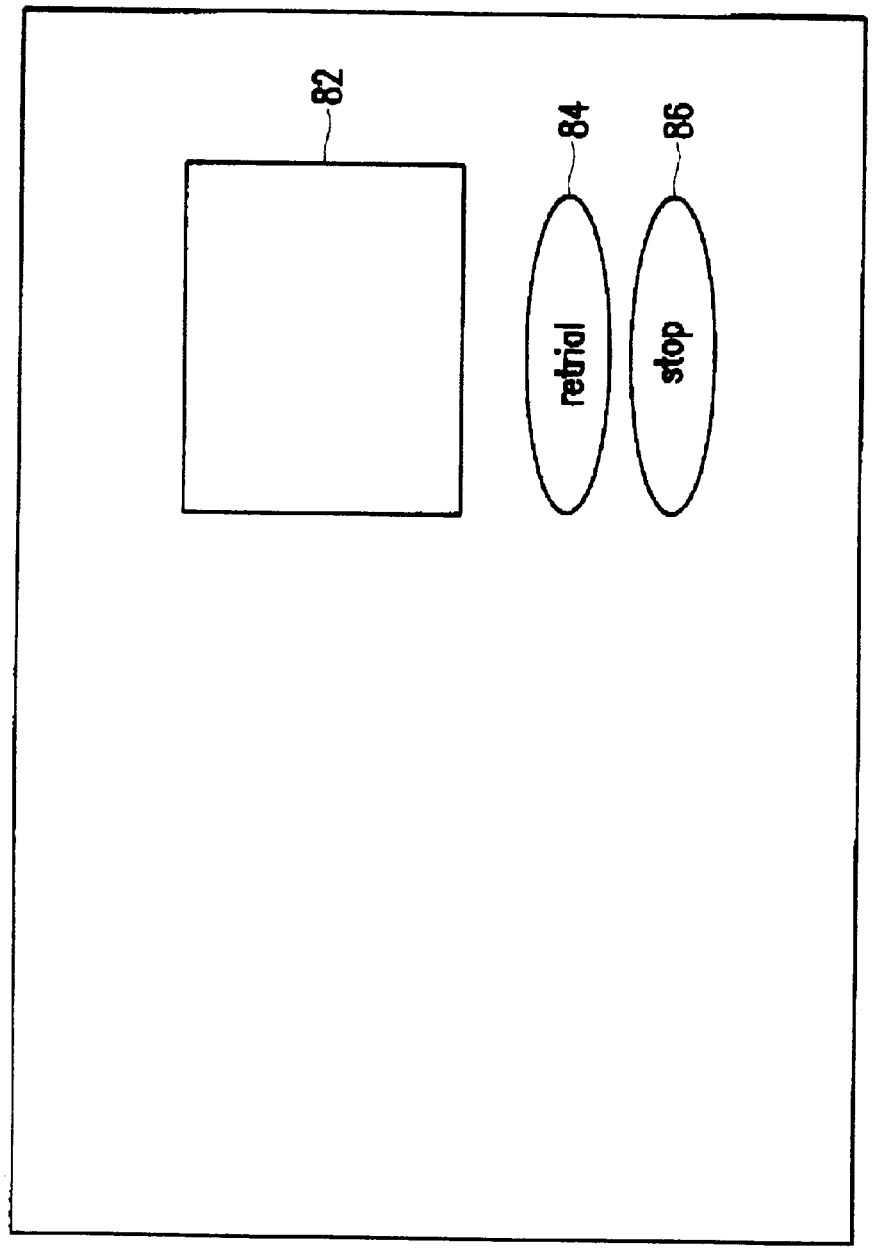
FIG. 13 is a view illustrating a game result display screen according to the present invention.

As shown in FIG. 10, when five minutes are passed, the current game automatically stops, and the game result display screen of FIG. 13 is displayed. The game result display screen includes a region 82 for displaying the advertisements, a game continue button 84 for continuing the game, and a button 86 for stopping the game. On the game result display screen, it is possible to check points of the game for the day, and the game is restarted, and the current state may be returned to the main menu.

On the current game screen which is displayed in the above-mentioned manner, the screen for the points range needed to become a winner for the day is displayed. Therefore, the gamer has the knowledge of points range to win and to plan their points scoring scheme to match the partially disclosed winning points.

In the embodiments of the present invention, the game may be performed five times for each game type per day, and the gamer who played five times cannot play any longer.

Finally, a winner is determined based on the total points of the gamer for each game type, and results of the game types for the day are stored. In the method for determining the winner according to the present invention, the gamer who obtained the points which match or are the nearest to the points suggested by the winwin2000 site is determined as a winner. Since one game is played for five times for two game types, the winners will be determined based on these ten registered points of each gamer.

When a winner is determined, the cash award and win money are inputted into the bank or winwin account. With the real name policy, members need to prove and verify their identity by sending a copy of their social security card, a copy of the personal bank account book, or other documents needed for identifying themselves.

In the embodiments of the present invention, the winner which obtained the points which are the nearest to the points suggested by the winwin2000 site is determined as a winner. In another embodiment of the present invention, the winner who obtained the highest points may be determined as a winner.

The advertising game according to the present invention is designed to play using a personal computer. In another embodiment of the present invention, the advertising game may be performed using a cellular phone instead of the personal computer. In addition, in the present invention, the points are obtained when the advertisements of the sponsors are aligned in a certain column, row, or diagonal direction as a point winning condition. However, in another embodiment of the present invention, the points may be obtained when the advertisements are aligned in a certain row, column, or diagonal direction by changing the row, column and diagonal directions of the advertisements.

As described above, in the present invention, since the game screen is composed of the advertisement frames, and the product advertisements of the sponsors are displayed on the advertisement frames for thereby removing a certain element which is unnecessary for the advertisements, it is possible to maximize an advertising effect by gathering a gamer's attention to the advertisements.

In addition, in the present invention, since a plurality of gamers participate in the game and compete with each other, the gamer does not feel tedious and it is possible to maximize the advertisement recognition effect.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. In an advertising game which is performed on an on-line network, an advertising game method, comprising:
   a step for sequentially displaying an initial screen and a main screen as a netizen(internet user) accesses a certain site;
   a step for displaying a game screen with respect to a certain game type as a game type is selected by a member on a main screen wherein said main screen includes:
   a display button for displaying a final total required time required for one game;
   an advertising display button composed of a plurality of frames;
   a display button for displaying points obtained when the advertisements on the frames are aligned in a column, row and diagonal direction;
   a display button for displaying the total points;
   a game start bar for starting the game;
   a display button for rotating the frames;
   an OK display button for obtaining a points displayed on the points display button; and
   a display button for finishing a triple chance game button and game which are used for obtaining an additional points except for the points displayed on the points display unit;

a step for rotating the frames when a game start instruction is inputted on the game screen;

a step for adding certain points to the total points in accordance with an aligned state of the advertisements displayed on the frames when the rotation of the frames stops;

a step for providing a hint to the gamer with respect to the obtained points of the day when the current game is being performed; and a step for displaying a winner of the day based on the points of the day when the game is finished.

2. The method of claim 1, wherein said advertisement display button is composed of a n×k number of frames(n>2, k>2).

3. The method of claim 2, wherein a product name, a product image, a company logo, a slogan and etc. are displayed on each frame.

4. The method of claim 3, wherein a n×k number of frames of the advertisement frames are moved from the left side to the right side by the row unit.

5. The method of claim 4, wherein the rotation of the frames of at least one row among a plurality of rows is stopped by a gamer.

6. The method of claim 5, wherein certain points are added to the total points when the rotation of the n×k number of the frames stops, and the advertisements of the same sponsor are aligned in a row, column, or diagonal direction.

7. The method of claim 6, wherein a corresponding advertisement is displayed by a pop-up method and a certain sound is outputted when the rotation of the n×k number of the frames stops, and the advertisements of the same sponsor are aligned in a row, column, or diagonal direction.

8. The method of claim 3, wherein the n×k number of the frames moves the advertisements of the frames from the right side to the left side by the row unit.

9. The method of claim 8, wherein the rotation of the frames of at least one row among a plurality of rows is stopped by a gamer.

10. The method of claim 9, wherein certain points are added to the total points when the rotation of the n×k number of the frames stops, and the advertisements of the same sponsor are aligned in a row, column, or diagonal direction.

11. The method of claim 10, wherein a corresponding advertisement is displayed by a pop-up method, and a certain sound is outputted when the rotation of the n×k number of the frames stops and the advertisements of the same sponsor are aligned in a row, column, or diagonal direction.

12. The method of claim 3, wherein a n×k number of frames moves the advertisements of the frames from an upper side to a lower side by the column unit.

13. The method of claim 12, wherein the rotation of the frames of at least one column among a plurality of columns is stopped by a gamer.

14. The method of claim 13, wherein certain points are added to the total points when the rotation of the n×k number of the frames is stopped, and the advertisements of the same sponsor are aligned in a row, column, or diagonal direction.

15. The method of claim 14, wherein a corresponding advertisement is displayed by a pop-up method and a certain sound is outputted when the rotation of the n×k number of the frames stops, and the advertisements of the same sponsor are aligned in a row, column, or diagonal direction.

16. The method of claim 3, wherein a n×k number of frames moves the advertisements of the frames from an upper side to a lower side by the column unit.

17. The method of claim 16, wherein the rotation of the frames of at least one column among a plurality of columns is stopped by a gamer.

18. The method of claim 17, wherein certain points are added to the total points when the rotation of the n×k number of the frames stops, and the advertisements of the same sponsor are aligned in a row, column, or diagonal direction.

19. The method of claim 18, wherein a corresponding advertisement is displayed by a pop-up method and a certain sound is outputted when the rotation of the n×k number of the frames stops, and the advertisements of the same sponsor are aligned in a row, column, or diagonal direction.

20. The method of claim 3, wherein said n×k number of the frames are randomly rotated independent from each other.

21. The method of claim 20, wherein the rotations of the frames of at least one row among a plurality of rows composed by the n×k number of the frames are stopped by a gamer.

22. The method of claim 21, wherein certain points are added to the total points when the rotation of the n×k number of the frames stops, and the advertisements of the same sponsor are aligned in a row, column, or diagonal direction.

23. The method of claim 22, wherein a corresponding advertisement is displayed by a pop-up method and a certain sound is outputted when the rotation of the n×k number of the frames stops, and the advertisements of the same sponsor are aligned in a row, column, or diagonal direction.

24. The method of claim 20, wherein the rotations of the frames of at least one column among a plurality of columns composed by the n×k number of the frames are stopped by a gamer.

25. The method of claim 24, wherein certain points are added to the total points when the rotation of the n×k number of the frames stops, and the advertisements of the same sponsor are aligned in a row, column, or diagonal direction.

26. The method of claim 25, wherein a corresponding advertisement is displayed by a pop-up method and a certain sound is outputted when the rotation of the n×k number of the frames stops, and the advertisements of the same sponsor are aligned in a row, column, or diagonal direction.

27. The method of claim 1, wherein said initial screen includes a screen link region for moving to the main screen, and a total hit number display region for displaying the total number of netizens who accessed the site.

28. The method of claim 27, wherein when a netizen clicks the screen link region, the main screen is displayed.

29. The method of claim 27, wherein said initial screen is automatically changed to the main screen after a certain time is elapsed.

30. The method of claim 1, wherein said main screen includes a log-out menu for exiting from the site, a winwin2000 menu for describing the site, a membership application menu used when a non-member applies for membership, a winwin account menu used for checking the balance of the winwin account, a winwin bulletin menu for listing certain messages on the bulletin board, a winner display menu for displaying the winners, a game entrance menu for selecting a game type, and a game result button, a demo game button and a start button displayed by clicking the game entrance menu.

31. The method of claim 30, wherein when said membership application menu is clicked, a membership application screen which includes a membership application link region used when a non-member applies for membership to fill-out the form, an information correction link region for correcting the submitted information in the membership application and a password link region for obtaining information when members forget their passwords are displayed.

32. The method of claim 30, wherein when said winwin account menu is clicked, a winwin account screen which includes a win money link region for displaying a current win money amount, a total earned amount, a total used amount, a credit and debit entries of the account, and a list of richest win money members, and a win money distribution region are displayed.

33. The method of claim 32, wherein advertising banners of sponsors are displayed at the left and right sides of the winwin account screen.

34. The method of claim 30, wherein when said winner display menu is displayed, a winner display screen which includes an advertising screen for displaying advertisements of the sponsors and a button region used when viewing the game winners are displayed.

35. The method of claim 34, wherein when said button region is clicked, it is possible to search a gamer's win list by the game types of a week.

36. The method of claim 30, wherein said start button is clicked, a log-in screen which includes a display button for imputing a gamer's information is displayed.

37. The method of claim 36, wherein advertising banners of sponsors are displayed at the left and right sides of the display button.

38. The method of claim 1, wherein a certain amount of money is inputted into a winner's winwin account.

39. The method of claim 1, wherein a winner number of the day is composed of 5 digits.

40. The method of claim 39, wherein advertising banners are displayed at a lower portion of each digit.

41. The method of claim 39, wherein a number of each digit is linkable to a site which provides information on the number of a corresponding digit.

42. The method of claim 1, wherein when a triple chance game button is clicked, a triple chance game screen which includes a start button for starting a triple chance game, a selection button for selecting a certain option between options displayed on the screen, a continue button(start button), and a button for stopping the triple chance game and returning to the main game is displayed.

43. The method of claim 1, wherein when the game is finished, a game result screen is displayed, so that a gamer can check their points of the day and return to the main screen.

44. The method of claim 43, wherein said game result display screen includes a region for displaying advertisements, a game continue button for continuing the game and a button for finishing the game.

* * * * *